No. 704,739. Patented July 15, 1902.
J. B. ENTZ.
SECONDARY BATTERY.
(Application filed Oct. 3, 1900.)
(No Model.)
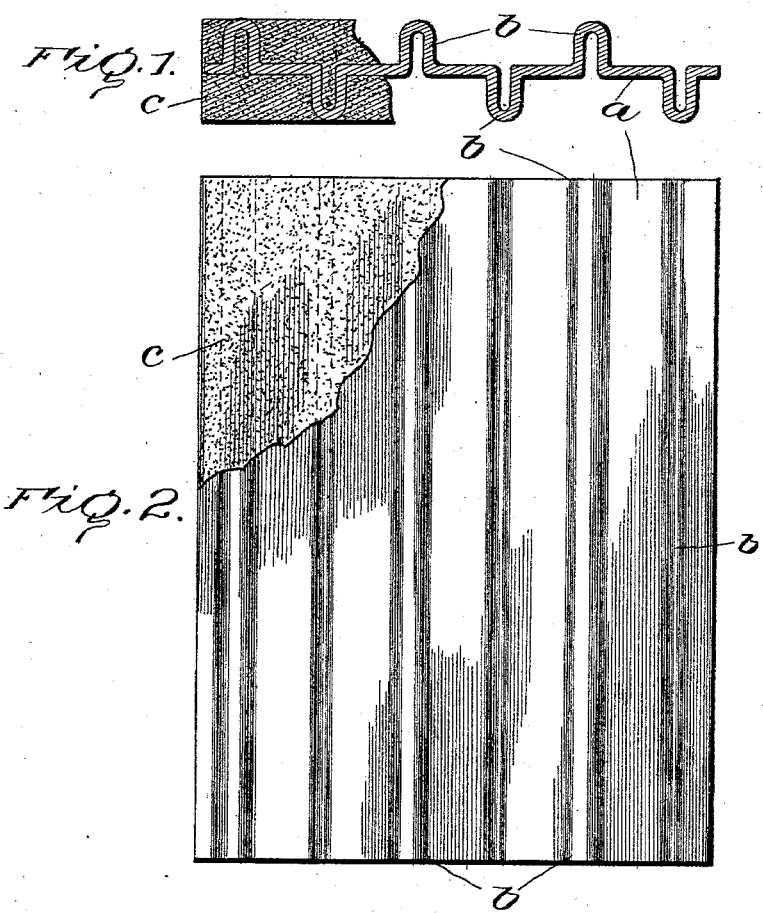
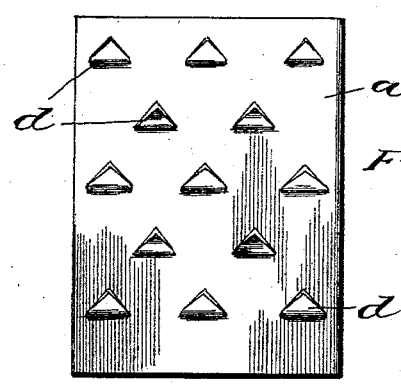
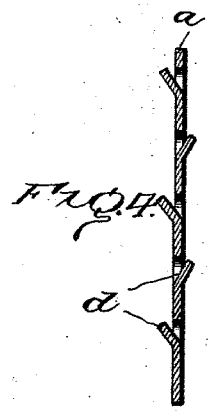

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SECONDARY BATTERY.

SPECIFICATION forming part of Letters Patent No. 704,739, dated July 15, 1902.

Application filed October 3, 1900. Serial No. 31,903. (No model.)

*To all whom it may concern:*

Be it known that I, JUSTUS B. ENTZ, a citizen of the United States, residing at Philadelphia, in the county of Philadelphia and State of Pennsylvania, have invented a certain new and useful Improvement in Secondary or Storage Batteries, of which the following is a specification.

The commercial success of automobiles propelled by electricity depends upon the provision of storage-battery plates which shall have sufficient capacity and mechanical strength and which shall be characterized by a great degree of lightness in weight.

It is the object of the present invention to provide a battery-plate well adapted to meet the requirements of electric automobiles and which shall be exceedingly light, of great electrical capacity in proportion to its weight, and of sufficient mechanical strength to withstand the uses for which it is intended.

To these and other ends hereinafter set forth the invention comprises the improvements hereinafter described and claimed.

In the drawings, Figure 1 is a section of a grid embodying features of the invention. Fig. 2 is an elevation of the grid partially pasted to constitute a battery-plate, and Figs. 3 and 4 are respectively an elevation and a section of one other of the many types of grids in which my invention may be embodied.

In the embodiment of my invention the grid is constructed of rolled antimonious lead, which is malleable by reason of the rolling. Eight per cent. of antimony may be mentioned as a proportion productive of good results; but the invention is not limited to any particular amount. The rolled antimonious grid is non-active—that is to say, it is not in use oxidized—and it is therefore durable and remains intact and is not "formed," so that it retains its initial strength during the existence of the plate. If it were not for the presence of the antimony, the grid would become formed or peroxidized and mechanically weakened, so that in a short time the plate as a whole would lose its initial mechanical strength and become worthless. To the grid there is applied active material or material to become active, and in order to secure the latter to place tangs, keys, or projections are formed upon the grid, either by puncturing and then bending or by bending without puncturing or otherwise. These provisions are essential to the efficiency of the plate, because they serve to hold the active material or material to become active to place in proper mechanical and electrical contact. The rolled antimonious-lead grid when of the minimum thickness lends itself to these provisions, whereas cast antimonious lead, because of its inherent brittleness and qualities, does not do so.

Referring to Fig. 1, the grid $a$ consists of rolled antimonious lead. It is exceedingly thin, and for the sake of description its thickness may be one millimeter, more or less. It is inactive and while serving as a good conductor is not itself oxidized or formed, so that it retains its mechanical strength, which is very much greater than that of pure lead of the same thickness, even before the latter is formed and far in excess of the latter if formed. It is also bent to form keys $b$, which retain the active material $c$ in good mechanical and electrical contact. Antimonious lead could not be cast of the thinness described, and if cast somewhat thicker the keys $b$ could not be bent. As shown in Figs. 3 and 4, the keys $d$ are formed by puncturing the grid and bending up the punctured portions.

It will be obvious to those skilled in the art to which the invention relates that modifications may be made in details without departing from the spirit thereof. Hence I do not limit myself to the precise construction and arrangement of parts hereinabove set forth and illustrated in the drawings; but,

Having thus described the nature and objects of the invention, what I claim as new, and desire to secure by Letters Patent, is—

1. A malleated antimonious-lead grid for a storage-battery plate, substantially as described.

2. A malleated antimonious-lead grid punctured to form tangs or keys for holding the active material or material to become active of a storage-battery plate, substantially as described.

3. A malleated antimonious-lead grid bent to form keys for holding the active material or material to become active of a storage-battery plate, substantially as described.

In testimony whereof I have hereunto signed my name.

JUSTUS B. ENTZ.

In presence of—
W. J. JACKSON,
K. M. GILLIGAN.